United States Patent
Lee

(10) Patent No.: US 10,956,261 B2
(45) Date of Patent: Mar. 23, 2021

(54) VOLATILE MEMORY DEVICE AND OPERATING METHOD THEREOF

(71) Applicant: SK hynix Inc., Gyeonggi-do (KR)

(72) Inventor: Dong Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/691,313

(22) Filed: Nov. 21, 2019

(65) Prior Publication Data

US 2020/0387424 A1 Dec. 10, 2020

(30) Foreign Application Priority Data

Jun. 5, 2019 (KR) .................... 10-2019-0066819

(51) Int. Cl.
*G06F 11/10* (2006.01)

(52) U.S. Cl.
CPC ...... *G06F 11/1048* (2013.01); *G06F 11/1004* (2013.01); *G06F 11/1068* (2013.01)

(58) Field of Classification Search
CPC .. G06F 11/10; G06F 11/1004; G06F 11/1048; G06F 11/1064; G06F 11/1076; H03M 13/09; H03M 13/293; G11C 29/42; G11C 29/52

See application file for complete search history.

(56) References Cited

U.S. PATENT DOCUMENTS

| 2010/0332945 A1* | 12/2010 | Cypher ............... H03M 13/293 714/763 |
| 2014/0376320 A1* | 12/2014 | Loh ........................ G11C 29/76 365/200 |
| 2019/0287632 A1* | 9/2019 | Asano ................ G11C 16/3495 |

FOREIGN PATENT DOCUMENTS

| KR | 10-2013-0020808 | 2/2013 |
| KR | 10-1531774 | 6/2015 |

* cited by examiner

*Primary Examiner* — Shelly A Chase
(74) *Attorney, Agent, or Firm* — IP & T Group LLP

(57) ABSTRACT

A volatile memory device includes memory cells arranged on rows and columns; first counters each storing a count value representing a number of cells in which first data is stored among cells of a corresponding column, wherein the count value is updated or maintained whenever a write operation on each of the rows is performed; a calculator calculating a number of cells in which the first data is stored for each of the columns upon a determination that an EDC check on any one row among the rows fails, and determining a column in which a bit flip occurs by comparing the calculated number and the count value for each of the columns; and a control circuit determining that a cell of the row on which the EDC check fails among cells of the column in which the bit flip occurs is the bit-flipped cell.

16 Claims, 10 Drawing Sheets

VOLATILE MEMORY DEVICE AND OPERATING METHOD THEREOF

CROSS-REFERENCE TO RELATED APPLICATION

The present application claims priority under 35 U.S.C. § 119(a) to Korean patent application number 10-2019-0066819, filed on Jun. 5, 2019, which is incorporated herein by reference in its entirety.

BACKGROUND

Field of Invention

The present disclosure generally relates to a volatile memory device and an operating method thereof, and more particularly, to a volatile memory device capable of correcting data stored in a memory cell in which a bit flip occurs, and an operating method of the volatile memory device.

Description of Related Art

A memory system may include a memory controller and a non-volatile memory device.

The memory controller may control the non-volatile memory device in response to a request from a host. The memory controller may temporarily store data required to control the non-volatile memory device in a volatile memory device. The volatile memory device may include, for example, a Static Random Access Memory (SRAM), a Dynamic Random Access Memory (DRAM), and the like.

SUMMARY

Embodiments provide a volatile memory device capable of checking a memory cell in which a bit flip occurs by using a small amount of overhead, and an operating method of the volatile memory device.

Embodiments also provide a volatile memory device capable of correcting data stored in a memory cell in which a bit flip occurs, and an operating method of the volatile memory device.

In accordance with an aspect of the present disclosure, there is provided a volatile memory device including a memory cell array including a plurality of memory cells arranged on a plurality of rows and a plurality of columns; a counter group including a plurality of first counters each configured to store a count value representing a number of memory cells in which first data is stored among memory cells of a corresponding column among the columns, wherein the count value is updated or maintained whenever a write operation on each of the rows is performed; a calculator configured to calculate a number of memory cells in which the first data is stored with respect to each of the columns, based on a result obtained by performing a read operation on the entire memory cell array, upon a determination that an error detection code (EDC) check on any one row among the rows fails, and determine a column in which a bit flip occurs by comparing the calculated number and the count value of the first counter with respect to each of the columns; and a control circuit configured to determine that a memory cell of the row on which the EDC check fails among memory cells of the column in which the bit flip occurs is the bit-flipped memory cell.

In accordance with another aspect of the present disclosure, there is provided a method for operating a volatile memory device including a plurality of memory cells arranged on a plurality of rows and a plurality of columns, the method including comparing data stored in a target row among the rows with data to be stored in the target row in a write operation; updating or maintaining a count value of a first counter, which corresponds to each of the columns, based on the comparison result, the count value representing a number of memory cells in which first data is stored among memory cell of a corresponding column; performing a read operation on all of the plurality of memory cells, upon a determination that an error detection code (EDC) check on any one row among the rows fails; calculating a number of memory cells in which the first data is stored with respect to each of the columns, based on a result obtained by performing the read operation; determining a column in which a bit flip occurs by comparing the calculated number and the count value of the first counter with respect to each of the columns; and determining that a memory cell of a row in which the EDC check fails among memory cells of the column in which the bit flip occurs is the bit-flipped memory cell.

In accordance with an aspect of the present disclosure, there is provided a volatile memory device including an array of memory cells arranged in column and row directions; a control circuit configured to control the array to perform read and write operations on a row basis; a counting circuit configured to update a first number of memory cells storing first data on a column basis within the array at each write operation; and a calculating circuit configured to count a second number of memory cells storing the first data on the column basis within the array, wherein the data includes an error detection code (EDC) check bit, wherein the calculating circuit detects, when read data has an error based on the EDC check bit, a column of which a memory cell has had a bit-flip by comparing the first and second numbers, wherein the control circuit is configured to control the array to correct the bit-flip within the read data.

DETAILED DESCRIPTION

The specific structural and functional description disclosed herein is merely illustrative for the purpose of describing embodiments of the present invention. The invention can be implemented in various forms and ways, and thus is not limited to the embodiments set forth herein. Throughout the specification, reference to "an embodiment" or the like is not necessarily to only one embodiment, and different references to any such phrase are not necessarily to the same embodiment(s).

Figure 1A:
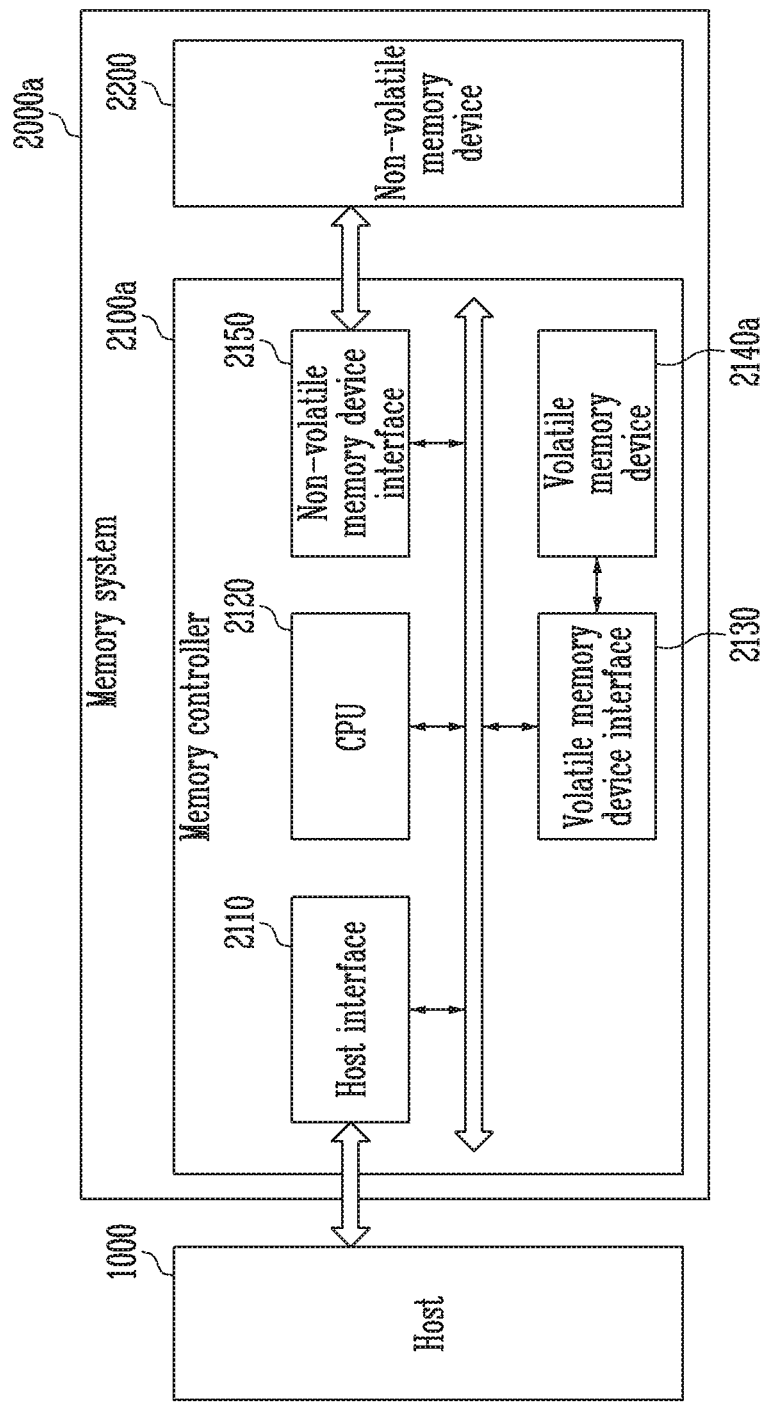
FIG. 1A is a diagram illustrating a memory system in accordance with an embodiment of the present disclosure.

FIG. 1A is a diagram illustrating a memory system in accordance with an embodiment of the present disclosure.

The memory system 2000a may include a non-volatile memory device 2200 configured to store data and a memory controller 2100a configured to control the non-volatile memory device 2200 in response to a request from a host 1000.

The host 1000 may be a device or system configured to store data in the memory system 2000a or retrieve data from the memory system 2000a. For example, the host 1000 may include at least one of a computer, a portable digital device, a tablet, a digital camera, a digital audio player, a television, a wireless communication device, or a cellular phone, but embodiments of the present disclosure are not limited thereto.

The memory controller 2100a may control overall operations of the memory system 2000a. The memory controller 2100a may include a host interface 2110, a Central Processing Unit (CPU) 2120, a volatile memory device interface 2130, a volatile memory device 2140a, and a non-volatile memory device interface 2150.

At least one of the host interface 2110, the volatile memory device interface 2130, the volatile memory device 2140a, or the non-volatile memory device interface 2150 may be controlled by the CPU 2120.

The host interface 2110 may perform communication with the host 1000. The host interface 2110 may communicate with the host 1000 by using at least one interface protocol among a Non-Volatile Memory express (NVMe), a Peripheral Component Interconnect-Express (PCI-E), an Advanced Technology Attachment (ATA), a Serial ATA (SATA), a Parallel ATA (PATA), a Universal Serial Bus (USB), a Multi-Media Card (MMC), an Enhanced Small Disk Interface (ESDI), an Integrated Drive Electronics (IDE), a Mobile Industry Processor Interface (MIPI), a Universal Flash Storage (UFS), a Small Computer System Interface (SCSI), or a Serial Attached SCSI (SAS). However, embodiments of the present disclosure are not limited thereto.

The CPU 2120 may control the non-volatile memory device 2200 in response to a request received from the host 1000 through the host interface 2110. For example, the CPU 2120 may perform a program operation, a read operation, an erase operation, and the like on the non-volatile memory device 2200.

The CPU 2120 may generate various data required to control the non-volatile memory device 2200, and temporarily store the generated data in the volatile memory device 2140a. For example, the CPU 2120 may manage an address mapping table in which logical addresses corresponding to various requests received from the host 1000 are mapped to physical addresses corresponding thereto, and the address mapping table may be temporarily stored in the volatile memory device 2140a.

In order to temporarily store data in the volatile memory device 2140a, the CPU 2120 may generate a write command and a write address, and transmit the generated write command and the generated write address to the volatile memory device 2140a through the volatile memory device interface 2130.

In order to read data temporarily stored in the volatile memory device 2140a, the CPU 2120 may generate a read command and a read address, and transmit the generated read command and the generated read address to the volatile memory device 2140a through the volatile memory device interface 2130.

The volatile memory device interface 2130 may perform communication with the volatile memory device 2140 by using any of various interface protocols.

The volatile memory device 2140a may store various data required for the memory controller 2100a to control the non-volatile memory device 2200. For example, the volatile memory device 2140a may store the address mapping table.

The volatile memory device 2140a may include, for example, a Static Random Access Memory (SRAM), a Dynamic Random Access Memory (DRAM), and the like, but embodiments of the present disclosure are not limited thereto.

The non-volatile memory device interface 2150 may perform communication with the non-volatile memory device 2200 by using any of various interface protocols.

The non-volatile memory device 2200 may perform a program operation, a read operation, an erase operation, and the like under the control of the memory controller 2100a.

Figure 1B:
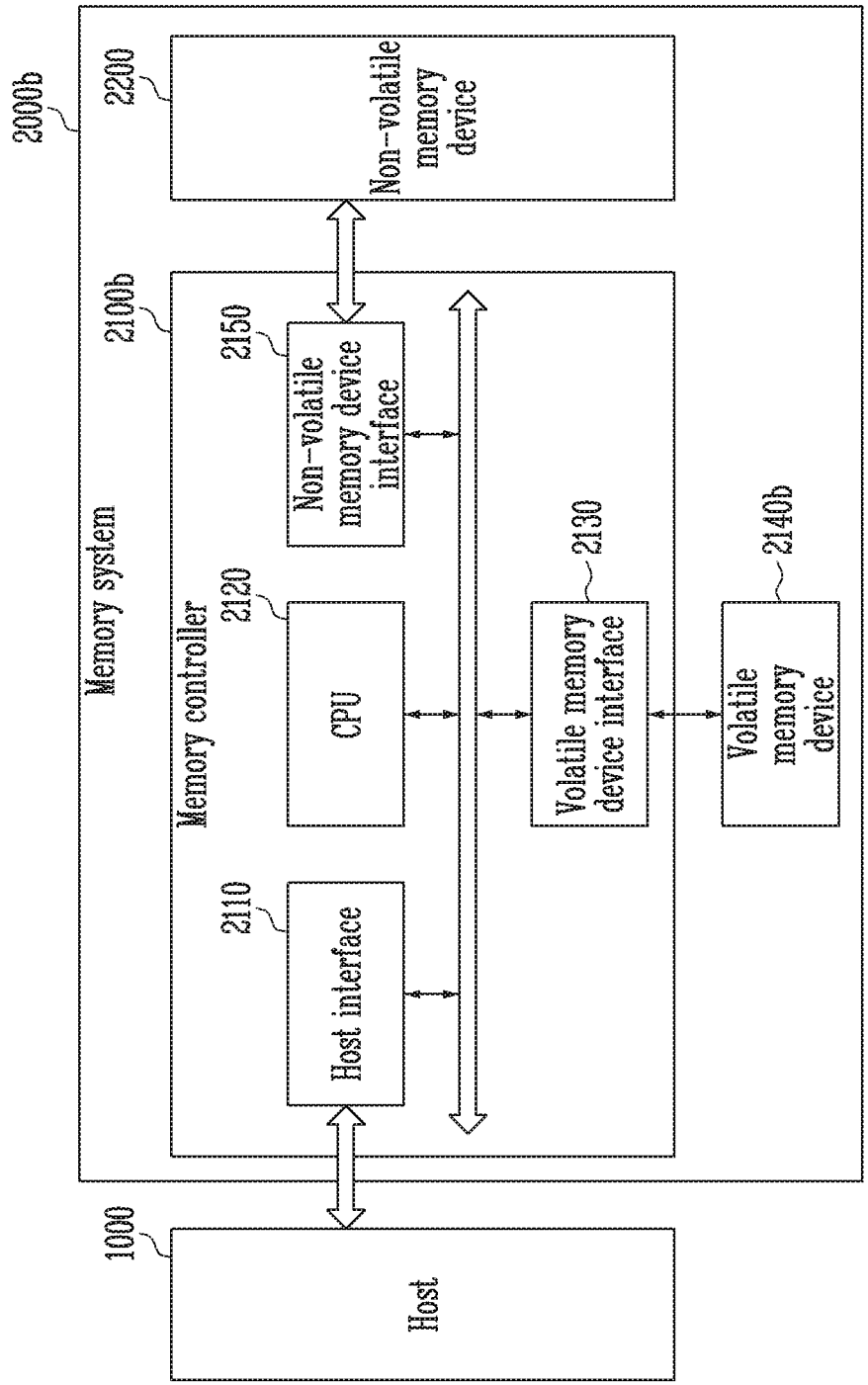
FIG. 1B is a diagram illustrating a memory system in accordance with an embodiment of the present disclosure.

FIG. 1B is a diagram illustrating a memory system in accordance with an embodiment of the present disclosure.

The memory system 2000b may include a non-volatile memory device 2200 configured to store data, a memory controller 2100b configured to control the non-volatile memory device 2200 in response to a request from a host 1000, and a volatile memory device 2140b configured to store various data for the memory controller 2100b to control the non-volatile memory device 2200.

The embodiment shown in FIG. 1B is different from the embodiment described with reference to FIG. 1A in that the volatile memory device 2140b externally to the memory controller 2100b. However, the general configuration and operation of the memory system 2000b shown in FIG. 1B are identical to those of memory system 2000a described with reference to FIG. 1A.

An error (e.g., a bit flip) may occur in data stored in the volatile memory device 2140a or 2140b due to interference between adjacent memory cells or power noise generated in other devices in close proximity to the memory system 2000a or 2000b. This error may cause an abnormal operation of the memory system 2000a or 2000b.

Embodiments of the present disclosure provide a solution for correcting an error occurring in the volatile memory device 2140a or 2140b by using only a small amount of overhead.

Figure 2:
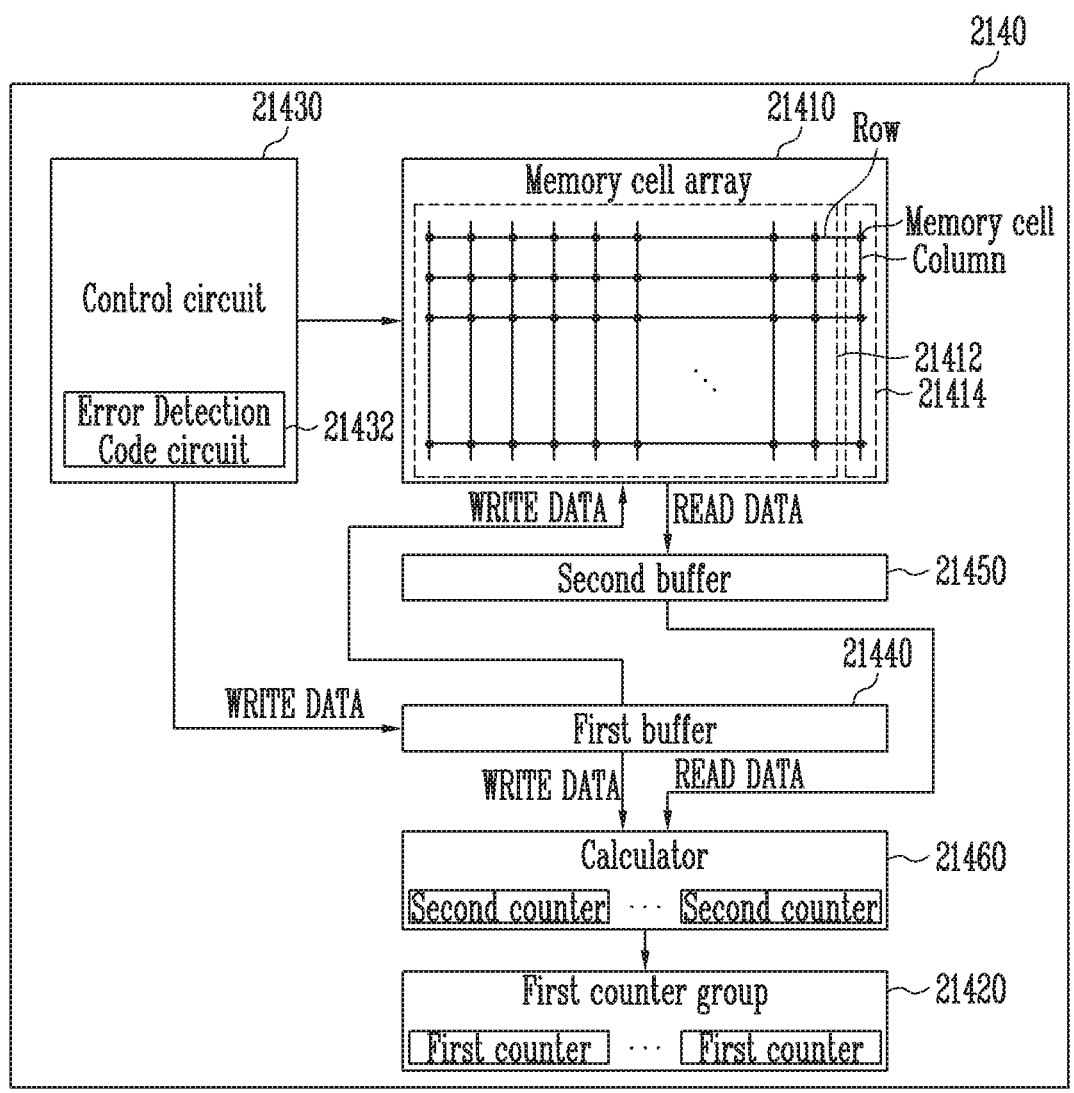
FIG. 2 is a diagram illustrating a process in which a volatile memory device performs a write operation in accordance with an embodiment of the present disclosure.

FIG. 2 is a diagram illustrating a process in which a volatile memory device performs a write operation in accordance with an embodiment of the present disclosure.

The volatile memory device 2140 (corresponding to 2140a shown in FIG. 1A or 2140b shown in FIG. 1B) may include a memory cell array 21410, a first counter group 21420, a control circuit 21430, a first buffer 21440, a second buffer 21450, and a calculator 21460.

The memory cell array 21410 may include a plurality of memory cells, which may be arranged at intersections of a plurality of columns and a plurality of rows. Hereinafter, when a write operation on a row is performed, this may mean that an operation of storing data in memory cells in the row is performed. Hereinafter, when a read operation on a row is performed, this may mean that an operation of reading data from memory cells in the row is performed.

The memory cell array 21410 may include a data area 21412 and a parity area 21414. In a write operation, data may be stored in the data area 21412. A parity of the data stored in the data area 21412 may be stored in the parity area 21414. In embodiments of the present disclosure, an Error Detection Code (EDC) may be used, and an EDC parity of one bit may be stored in the parity area 21414.

The first counter group 21420 may include a plurality of first counters. For example, the first counter group 21420 may include first counters, the number of which is equal to that of columns in the memory cell array 21410. For example, the first counters may correspond one-to-one to the respective columns in the memory cell array 21410. Each of the first counters may store a count value representing a number of memory cells in which first data is stored among memory cells in the corresponding column. The memory cells may store a value of '0' or '1.' In the following description, the first data is '1' and second data is '0'. However, embodiments of the present disclosure are not limited thereto; the opposite case in which the first data is '0' and the second data is '1' is possible. In an embodiment, each of the first counters may be implemented as a flip-flop.

The first counter group 21420 may increase, decrease or maintain the count values of the first counters according to a control signal received from the calculator 21460.

The control circuit 21430 may receive a write command, a write address, data, and the like. The write command, the write address, the data, and the like may be received from the CPU 2120 through the volatile memory device interface 2130. The write address may correspond to at least one row among the plurality of rows in the memory cell array 21410. By way of example, a case where the write address corresponds to one row among the plurality of rows in the memory cell array 21410 is assumed and described. However, embodiments of the present disclosure are not limited thereto.

The control circuit 21430 may include an error detection code circuit 21432. The error detection code circuit 21432 may add an EDC parity of one bit to data received in a write operation. Hereinafter, the data to which the EDC parity of one bit is added is referred to write data. The control circuit 21430 may store the write data in the first buffer 21440.

The control circuit 21430 may control the memory cell array 21410 to perform read and write operations on a row basis. The control circuit 21430 may perform a read operation on the memory cell array 21410 before the control circuit 21430 performs a write operation on the memory cell array 21410. For example, the control circuit 21430 may control the memory cell array 21410 such that a read operation on a row corresponding to a write address can be performed. The control circuit 21430 may control the memory cell array 21410 such that read data acquired as a result of performing the read operation on the row corresponding to the write address can be stored in the second buffer 21450.

The calculator 21460 may receive write data from the first buffer 21440, and receive read data from the second buffer 21450. The calculator 21460 may compare the write data received from the first buffer 21440 with the read data received from the second buffer 21450 in units of bits, and generate a control signal according to the comparison result and then transmit the control signal to the first counter group 21420.

For example, when read data of one bit, which corresponds to a column in the memory cell array 21410, has a value different from that of write data of one bit, which corresponds to the same column, the calculator 21460 may generate a control signal instructing the first counter group 21420 to update a count value corresponding to that column, and transmit the control signal to the first counter group 21420.

For example, when read data of one bit corresponding to a column has a value of 0, and write data of one bit corresponding to the same column has a value of 1, the calculator 21460 may generate a control signal instructing the first counter group 21420 to increase (e.g., by 1) a count value corresponding to the column, and transmit the control signal to the first counter group 21420.

When the reverse situation is encountered, that is, when read data of one bit corresponding to a column has a value of 1, and write data of one bit corresponding to the same column has a value of 0, the calculator 21460 may generate a control signal instructing the first counter group 21420 to decrease (e.g., by 1) a count value corresponding to the column, and transmit the control signal to the first counter group 21420.

Also, when both read data of one bit and write data of one bit, which correspond to a column, have the same value, the calculator 21460 may generate a control signal instructing the first counter group 21420 to maintain a count value corresponding to the column, and transmit the control signal to the first counter group 21420.

In some embodiments, however, when both read data of one bit and write data of one bit, which correspond to a column, represent the same value, the calculator 21460 may not transmit a control signal corresponding to the column to the first counter group 21420, since the first counter group 21420 does not need to change the count value.

When update of the first counter group 21420 is completed, the calculator 21460 may notify the control circuit 21430 that the update of the first counter group 21420 has been completed.

When the calculator 21460 notifies the control circuit 21430 that the update of the first counter group 21420 has been completed, the control circuit 21430 may control the memory cell array 21410 such that a write operation can be performed. For example, the control circuit 21430 may control the first buffer 21440 and the memory cell array 21410 such that the write data stored in the first buffer 21440 is stored in a row corresponding to the write address.

Figure 3:
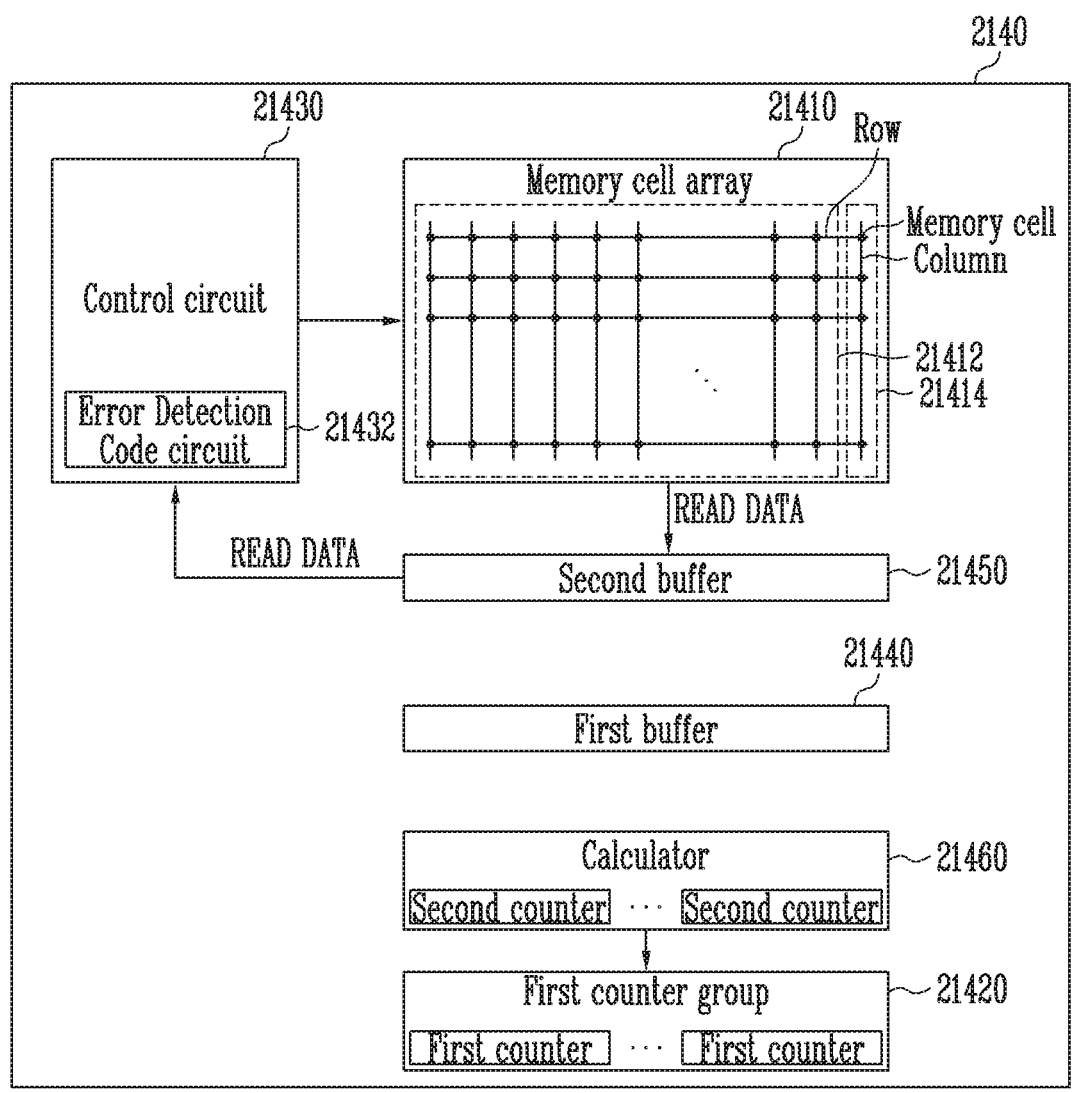
FIG. 3 is a diagram illustrating an exemplary process in which a volatile memory device, such as that shown in FIG. 2, performs a read operation.

FIG. 3 is a diagram illustrating a process in which the volatile memory device shown in FIG. 2 performs a read operation.

In the embodiment described with reference to FIG. 3, content already described with reference to FIG. 2 is omitted here.

The control circuit 21430 may receive a read command, a read address, and the like from the CPU 2120 through the volatile memory device interface 2130. The read address may correspond to at least one row among the plurality of rows in the memory cell array 21410. By way of example, a case where the read address corresponds to one row among the plurality of rows in the memory cell array 21410 is described below. However, embodiments of the present disclosure are not limited thereto.

The control circuit 21430 may control the memory cell array 21410 such that data is read from the row corresponding to the read address. The control circuit 21430 may control the memory cell array 21410 such that data read from the row corresponding to the read address is stored in the second buffer 21450.

The control circuit 21430 may receive read data from the second buffer 21450. The error detection code circuit 21432 may perform an EDC check on the read data received from the second buffer 21450.

When the EDC check passes, the control circuit 21430 may output the read data received from the second buffer 21450. For example, the read data may be transmitted to the CPU 2120 through the volatile memory device interface 2130.

When the EDC check fails, the control circuit 21430 may output a signal representing that the EDC check has failed. For example, the control circuit 21430 may notify the CPU 2120 that the EDC check has failed, through the volatile memory device interface 2130.

Figure 4:
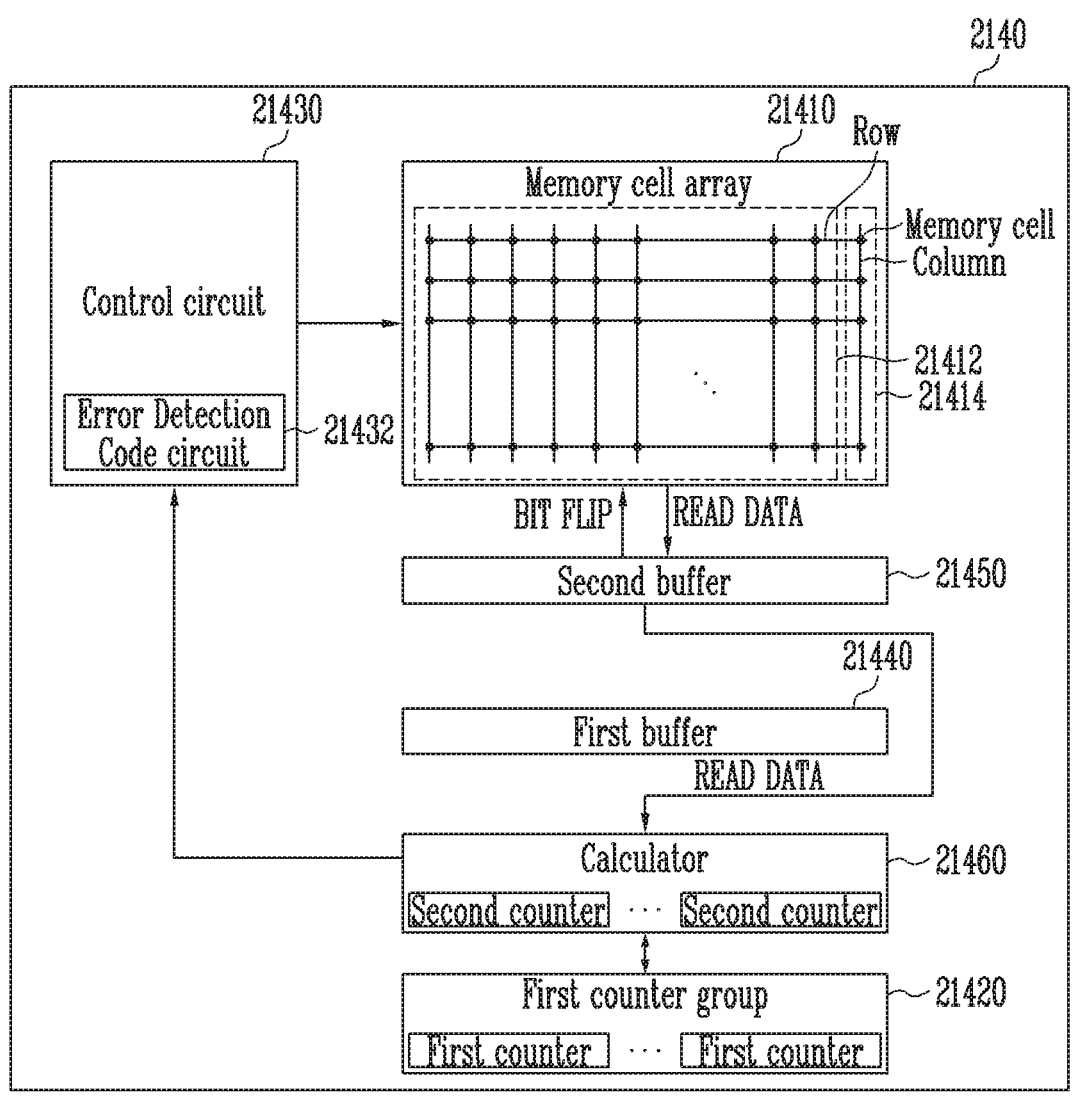
FIG. 4 is a diagram illustrating an exemplary process in which a volatile memory device, such as that shown in FIG. 2, performs error correction.

FIG. 4 is a diagram illustrating a process in which the volatile memory device shown in FIG. 2 performs error correction.

In the embodiment described with reference to FIG. 4, content already described with reference to FIGS. 2 and 3 is omitted here.

The control circuit 21430 may receive an error correction command and a target address from the CPU 2120 through the volatile memory device interface 2130. The target address may be equal to the row address at which the EDC check fails, as described with reference to FIG. 3.

The control circuit 21430 may control the memory cell array 21410 such that a read operation on all memory cells in the memory cell array 21410 can be performed. For example, the control circuit 21430 may control the memory cell array 21410 such that a read operation can be sequentially performed on all rows in the memory cell array 21410. The control circuit 21430 may control the memory cell array 21410 such that, whenever a read operation on one row is performed, read data obtained by performing the read operation is stored in the second buffer 21450.

The calculator 21460 may calculate a number of memory cells in which the first data (e.g., '1') is stored among memory cells of a corresponding column in the memory cell array 21410. The calculator 21460 may include a second counter for each of the columns in the memory cell array 21410. In an embodiment, each of the second counters may be implemented as a flip-flop.

For example, the calculator 21460 may receive read data from the second buffer 21450 whenever read data corresponding to any one row among the plurality of rows in the memory cell array 21410 is stored in the second buffer 21450. The calculator 21460 may increase (e.g., by 1) a count value of a second counter, which corresponds to the first data among the read data received from the second buffer 21450.

When a read operation on all of the rows is completed, the calculator 21460 may compare a count value of the first counter and a count value of the second counter with respect to each of the plurality of columns. The calculator 21460 may determine that a bit flip has occurred in a column where the count value of the first counter and the count value of the second counter do not agree with each other.

The calculator 21460 may provide the control circuit 21430 with information on the column in which the bit flip occurs (e.g., a column index).

The control circuit 21430 may receive the information on the column in which the bit flip occurs from the calculator 21460. When the information on the column in which the bit flip occurs represents that the bit flip has occurred in two or more columns, the control circuit 21430 may output a signal representing that error correction cannot be performed. For example, the control circuit 21430 may notify the CPU 2120 that the error correction cannot be performed, through the volatile memory device interface 2130.

When the information on the column in which the bit flip occurs represents that the bit flip has occurred in that column, the control circuit 21430 may control the memory cell array 21410 such that data stored in a memory cell in which the bit flip occurs can be flipped back. For example, the control circuit 21430 may determine that a memory cell of the row where the EDC check fails among memory cells of the column in which the bit flip occurs is the bit-flipped memory cell, and control the memory cell array 21410 such that data stored in the bit-flipped memory cell is flipped back.

Figure 5:
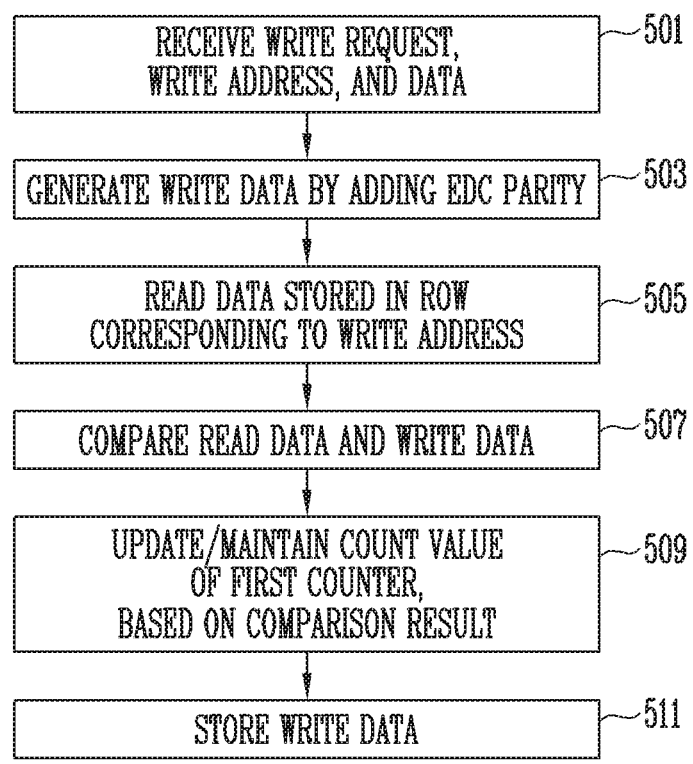
FIG. 5 is a flowchart illustrating an operation of a volatile memory device in accordance with an embodiment of the present disclosure.

FIG. 5 is a flowchart illustrating an operation of the volatile memory device in accordance with an embodiment of the present disclosure.

In step 501, the volatile memory device 2140 may receive a write request, a write address, and data.

In step 503, the volatile memory device 2140 may generate write data by adding an EDC parity to the data received in the step 501.

In step 505, the volatile memory device 2140 may acquire read data by performing a read operation on a row corresponding to the write address.

In step 507, the volatile memory device 2140 may compare the read data and the write data. For example, the volatile memory device 2140 may compare the read data and the write data with respect to each of the columns included in the memory cell array 21410.

In step 509, the volatile memory device 2140 may update or maintain a count value of each of multiple first counters, which respectively correspond to the plurality of columns, based on the comparison result in the step 507. For example, the volatile memory device 2140 may update a count value corresponding to a column where the read data and the write data are different from each other. For example, the volatile memory device 2140 may maintain a count value corresponding to a column where the read data and the write data are equal to each other.

In step 511, the volatile memory device 2140 may store the write data in the row corresponding to the write address.

Figure 6:
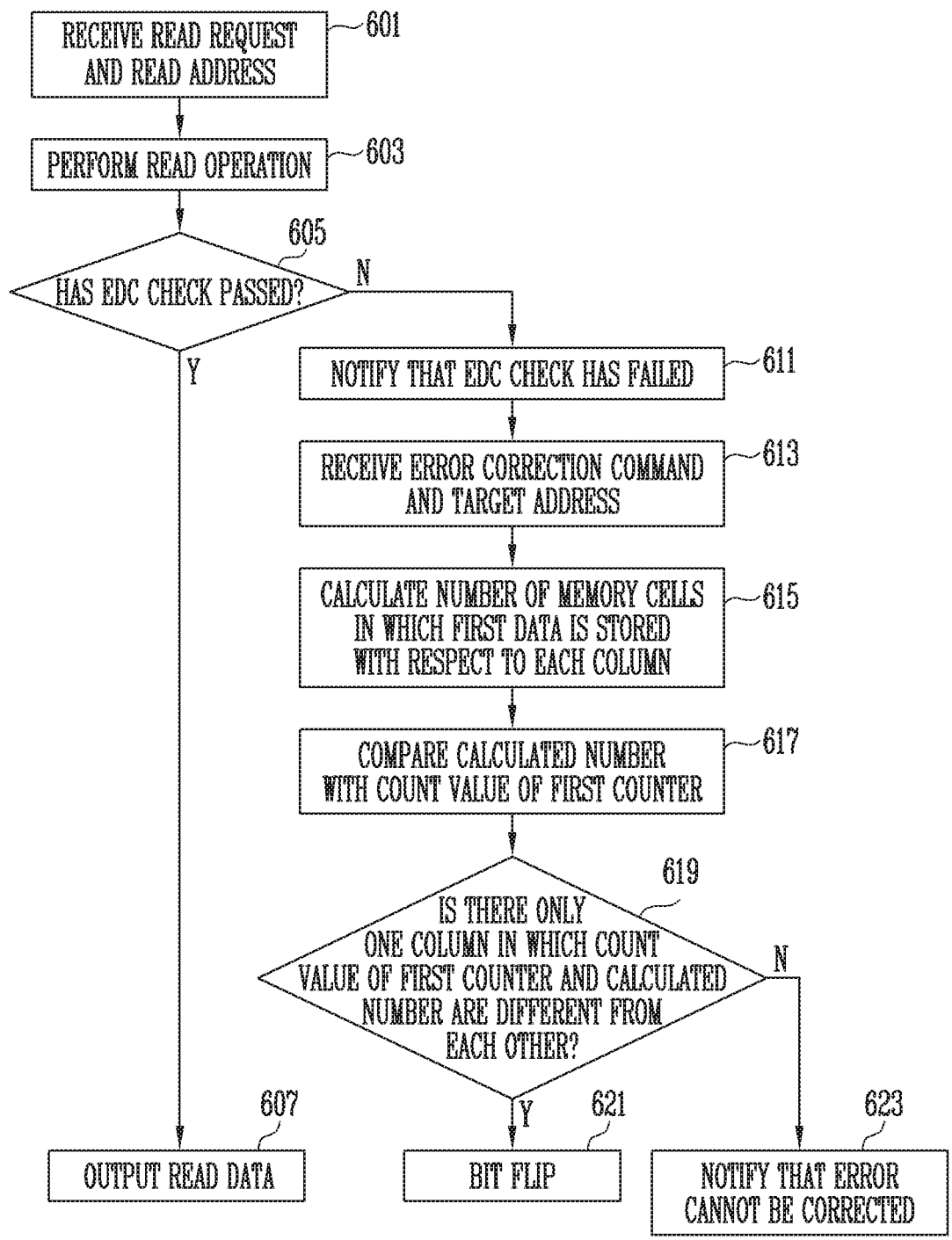
FIG. 6 is a flowchart illustrating an operation of a volatile memory device in accordance with an embodiment of the present disclosure.

FIG. 6 is a flowchart illustrating an operation of the volatile memory device in accordance with an embodiment of the present disclosure.

In step 601, the volatile memory device 2140 may receive a read request and a read address.

In step 603, the volatile memory device 2140 may acquire read data by performing a read operation on a row corresponding to the read address.

In step 605, the volatile memory device 2140 may perform an EDC check on the read data. When the EDC check passes (Y at 605), step 607 may be performed. When the EDC check fails (N at 605), step 611 may be performed.

In step 607, the volatile memory device 2140 may output the read data.

Meanwhile, in step 611, the volatile memory device 2140 may notify the CPU 2120 that the EDC check has failed.

In step 623, the volatile memory device 2140 may receive an error correction command and a target address from the CPU 2120. The target address may be an address equal to the read address received in the step 601.

In step 615, the volatile memory device 2140 may perform a read operation on all memory cells in the memory cell array 21410, and calculate a number of memory cells in which first data is stored with respect to each of the columns in the memory cell array 21410. The calculated number of memory cells may be stored as a count value of a second counter, one of which corresponds to each column.

In step 617, the volatile memory device 2140 may compare, for each column, a count value of the corresponding first counter and the calculated number.

In step 619, the volatile memory device 2140 may determine a number of columns for which a count value of a first counter and the calculated number are different from each other. When the number of columns determined at step 619 is one (Y at 619), step 621 may be performed. When the number of columns determined at step 619 is two or more (N), step 623 may be performed. When the number of columns determined at step 619 is one, the volatile memory device 2140 may determine that a bit-flipped memory cell exists on the corresponding column.

In the step 621, the volatile memory device 2140 may determine that a memory cell in the column where the count value of the first counter and the calculated number are different from each other, which is determined in step 619, among memory cells in a row corresponding to the target address received in step 613, is the bit-flipped memory cell. Therefore, the volatile memory device 2140 may flip data stored in the memory cell determined as the bit-flipped memory cell.

In step 623, the volatile memory device 2140 may notify the CPU 2120 that the error cannot be corrected.

Figure 7:
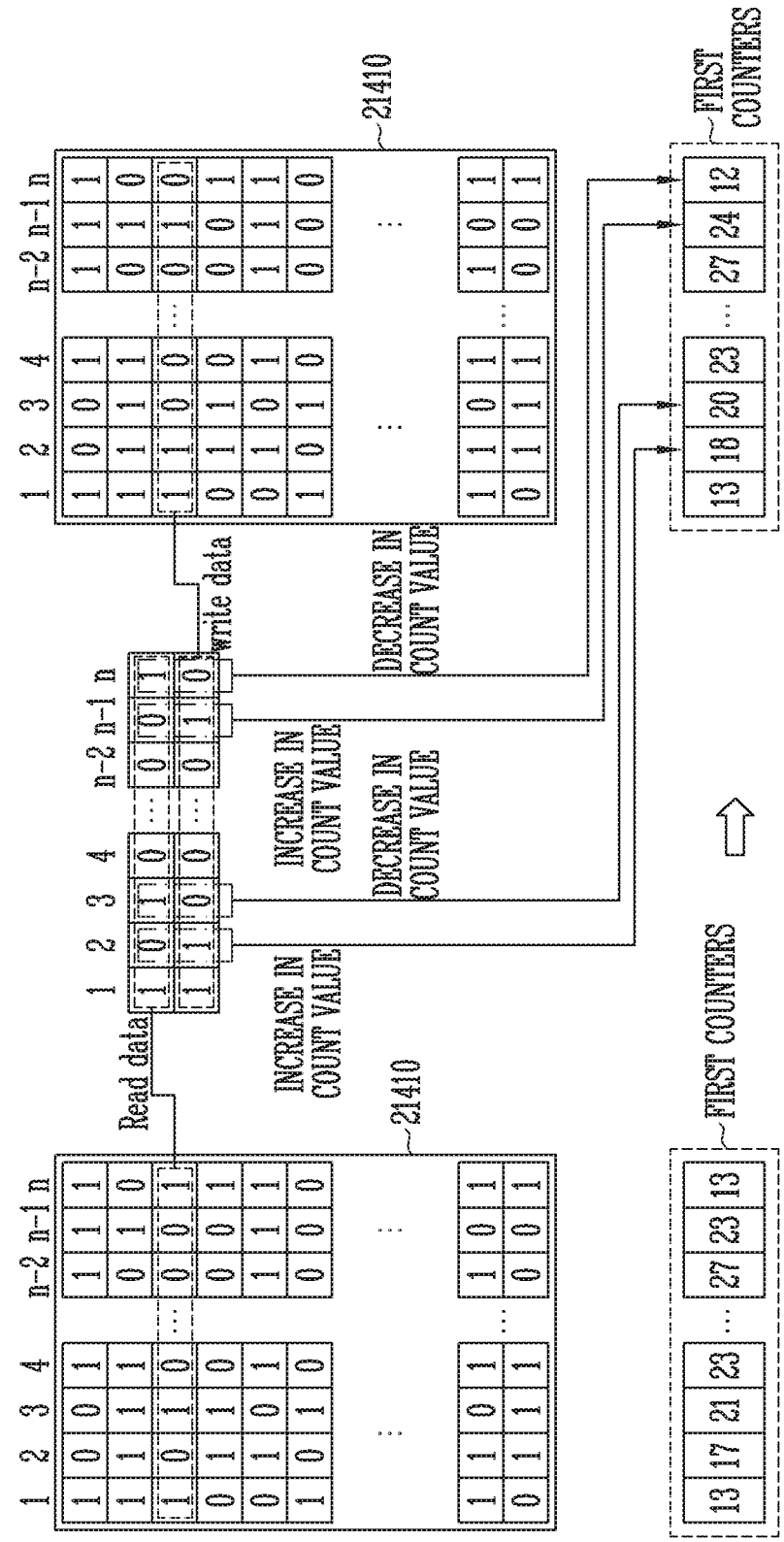
FIG. 7 is a diagram illustrating a write operation of a volatile memory device in accordance with an embodiment of the present disclosure.

FIG. 7 is a diagram illustrating a write operation of the volatile memory device in accordance with an embodiment of the present disclosure.

In FIG. 7, the memory cell array 21410 having n columns and count values of first counters corresponding to the respective columns are illustrated.

In the example shown in FIG. 7, a situation in which data $\{1, 0, 1, 0, \ldots, 0, 0, 1\}$ is stored in a third row of the memory cell array 21410 is assumed. In addition, a situation in which write data $\{1, 1, 0, 0, \ldots, 0, 1, 0\}$ to be stored in the third row of the memory cell array 21410 is generated is assumed.

The volatile memory device 2140 may maintain or update count values of first counters corresponding to the respective columns by comparing the data stored in the third row with the write data to be stored in the third row. For example, the volatile memory device 2140 may maintain, as it is, a count value of a first counter corresponding to a column where the stored data and the write data are equal to each other, and update a count value of a first counter corresponding to a column where the stored data and the write data are different from each other.

Referring to FIG. 7, it can be seen that count values of first counters corresponding to a first column, a fourth column, and an (n−2)th column, which are columns where both the stored data and the write data are both '1' or both '0', are maintained as '13', '23', and '27', respectively.

On the other hand, it can be seen that count values of first counters corresponding to a second column and an (n−1)th column, which are columns where the stored data are '0' and the write data is '1', are '18' and '24', which are increased by 1, respectively.

Further, it can be seen that count values of first counters corresponding to a third column and an nth column, which are columns where the stored data are '1' and the write data is '0', are '20' and '12', which are decreased by 1, respectively.

The volatile memory device 2140 may maintain or update the count values of the first counters, based on the comparison result of the stored data and the write data, and then store the write data in the memory cell array 21410.

Figure 8:
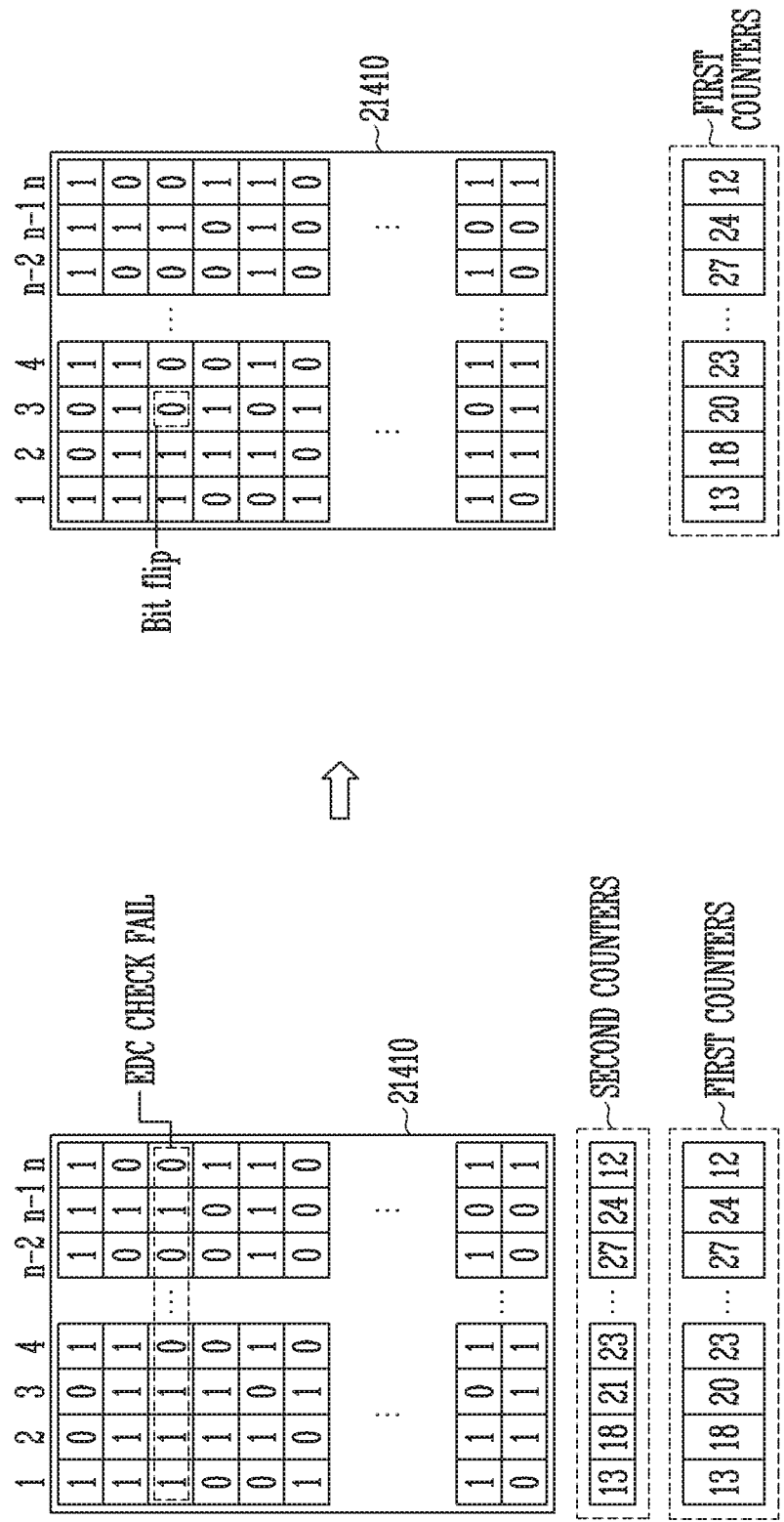
FIG. 8 is a diagram illustrating a bit flip operation of a volatile memory device in accordance with an embodiment of the present disclosure.

FIG. 8 is a diagram illustrating a bit flip operation of the volatile memory device in accordance with an embodiment of the present disclosure.

In FIG. 8, the memory cell array 21410 having n columns and count values of first counters corresponding to the respective columns are illustrated.

In the example shown in FIG. 8, a situation in which data $\{1, 1, 1, 0, \ldots, 0, 1, 0\}$ is stored in a third row of the memory cell array 21410 is assumed. In addition, a case where an EDC check fails in the third row of the memory cell array 21410 is assumed.

When the EDC check fails, the volatile memory device 2140 may perform a read operation on all memory cells in the memory cell array 21410, and calculate a number of memory cells in which data '1' is stored with respect to each column. A count value of each second counter represents a number of memory cells in which the data '1' is stored, which is calculated according to the read operation performed when the EDC check fails.

The volatile memory device 2140 may check a memory cell in which a bit flip occurs by comparing a count value of a first counter and a count value of a second counter for each column. In the example shown in FIG. 8, it can be seen that a count value of a first counter and a count value of a second counter are equal to each other with respect to each of the other columns except a third column. Therefore, the volatile memory device 2140 may determine that a bit-flipped memory cell exists in the third column. In addition, since the EDC check has failed in the third row, the volatile memory device 2140 may determine that a memory cell of the third column among memory cells of the third row is the bit-flipped memory cell.

The volatile memory device 2140 may flip data stored in the memory cell determined as the bit-flipped memory cell. In the example shown in FIG. 8, it can be seen that a value of the memory cell existing in the third column of the third row has been flipped from '1' to '0.'

An Error Correction Code (ECC) and an Error Detection Code (EDC) may be used as a representative solution for correcting an error occurring in a memory system. When a unit of data processing (e.g., a unit of write) is 4 bytes (i.e., 32 bits), an ECC parity of seven bits may be used in the ECC, and an EDC parity of one bit may be used in the EDC. When the ECC parity of seven bits is used, an overhead of about 17% occurs with respect to data. When the EDC parity of one bit is used, an overhead of about 3% occurs with respect to data.

In embodiments of the present disclosure, an error occurring in the volatile memory device 2140 can be corrected by adding only simple components (e.g., calculator 21460 and first count group 21420) while using the EDC parity. That is, an error occurring in the volatile memory device 2140 can be corrected while incurring only a relatively small amount of overhead, as compared with the solution using the ECC.

Figure 9:
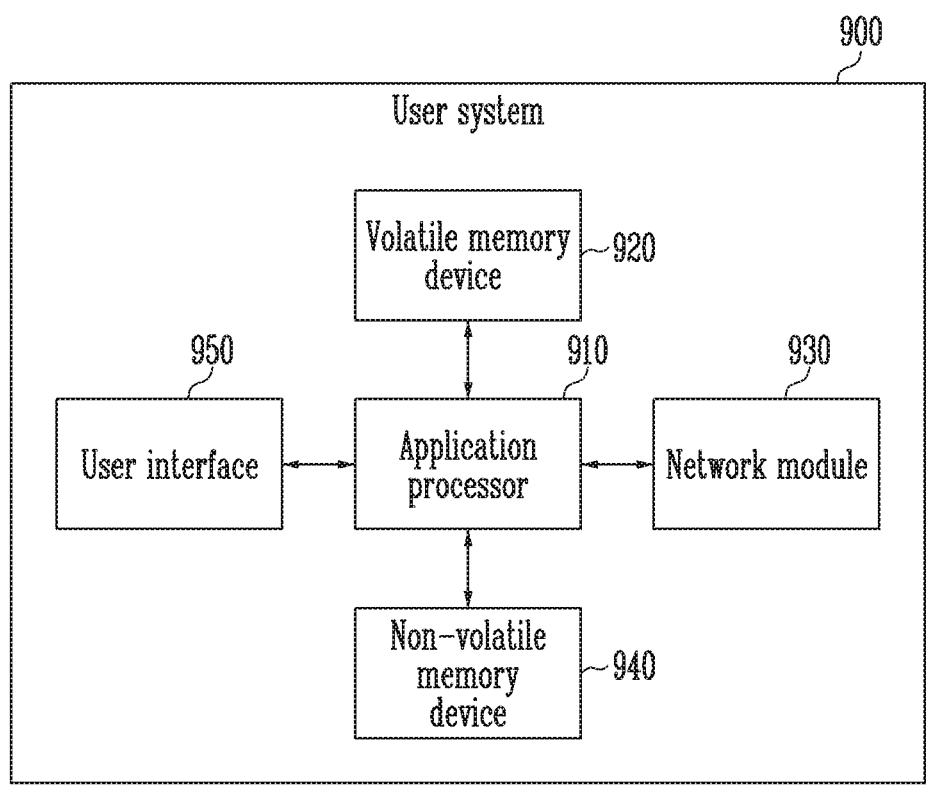
FIG. 9 is a diagram illustrating a user system including a volatile memory device, such as that shown in FIGS. 1A to 4.

FIG. 9 is a diagram illustrating a user system including the volatile memory device shown in FIGS. 1A to 4.

The user system 900 may include an application processor 910, a volatile memory device 920, a network mobile 930, a non-volatile memory device 940, and a user interface 950.

The application processor 910 may drive various programs and an Operating System (OS) to control the user system 900.

The volatile memory device 920 may operate as a main memory, a working memory, a buffer memory or a cache memory, which is for an operation of the user system 900. The volatile memory device 920 may include a DRAM, an SRAM, or the like.

The network module 930 may perform communication with external devices. For example, the network module 930 may perform communication with external devices by using at least one of code division multiple access (CDMA), global system for mobile communication (GSM), wideband CDMA (WCDMA), CDMA-2000, time division multiple access (TDMA), or long term evolution (LTE).

The non-volatile memory device 940 may store data. For example, the non-volatile memory device 940 may store data received from the application processor 910 or transmit stored data to the application processor 910. The non-volatile memory device 940 may be provided as a detachable storage medium such as a memory card or an external drive.

The user interface 950 may receive data from a user or output data to the user. For example, the user interface 950 may include a keyboard, a keypad, a button, a touch screen, a camera, a microphone, a speaker, and the like.

In accordance with embodiments of the present disclosure, a memory cell in which a bit flip occurs can be checked by using a small amount of overhead, and data stored in the checked memory cell can be corrected.

While various embodiments have been illustrated and described in some detail for purposes of clarity and understanding, the present invention is not limited to any particular embodiment nor any specific details. As those skilled in the art will appreciate in light of the present disclosure, there are alternative ways of implementing the invention. The disclosed embodiments are thus illustrative, not restrictive. The present invention encompasses all variations and modifications that fall within the scope of the claims and their equivalents.

What is claimed is:

1. A volatile memory device comprising:
   a memory cell array including a plurality of memory cells arranged on a plurality of rows and a plurality of columns;
   a counter group including a plurality of first counters each configured to store a count value representing a number of memory cells in which first data is stored among memory cells of a corresponding column among the columns, wherein the count value is updated or maintained whenever a write operation on each of the rows is performed;
   a calculator configured to calculate a number of memory cells in which the first data is stored with respect to each of the columns, based on a result obtained by performing a read operation on the entire memory cell array, upon a determination that an error detection code (EDC) check on any one row among the rows fails, and determine a column in which a bit flip occurs by comparing the calculated number and the count value of the first counter with respect to each of the columns; and
   a control circuit configured to determine that a memory cell of the row on which the EDC check fails among memory cells of the column in which the bit flip occurs is the bit-flipped memory cell.

2. The volatile memory device of claim 1, wherein the calculator is configured to determine that the bit flip occurs in a column where the corresponding calculated number and the count value of the corresponding first counter are not the same.

3. The volatile memory device of claim 1, wherein, in the write operation, the calculator is configured to compare data stored in a target row with data to be stored in the target row; and instruct the counter group to update a count value corresponding to at least one column among the columns based on the comparison result.

4. The volatile memory device of claim 3, wherein, in the write operation, the calculator is configured to instruct the counter group to decrease a count value corresponding to a column where the data stored in the target row represents the first data and the data to be stored in the target row represents second data.

5. The volatile memory device of claim 3, wherein, in the write operation, the calculator is configured to instruct the counter group to increase a count value corresponding to a column where the data stored in the target row represents second data and the data to be stored in the target row represents the first data.

6. The volatile memory device of claim 3, wherein, in the write operation, the calculator is configured to instruct the counter group to maintain a count value corresponding to a column where both the data stored in the target row and the data to be stored in the target row represent the first data or represent second data.

7. The volatile memory device of claim 1, wherein the control circuit is configured to control the memory cell array to flip data stored in a memory cell determined as the bit-flipped memory cell.

8. The volatile memory device of claim 1, wherein the control circuit is configured to perform the EDC check on the one row when a read operation on the one row is requested.

9. A method for operating a volatile memory device including a plurality of memory cells arranged on a plurality of rows and a plurality of columns, the method comprising:
   comparing data stored in a target row among the rows with data to be stored in the target row in a write operation;
   updating or maintaining a count value of a first counter, which corresponds to each of the columns, based on the comparison result, the count value representing a number of memory cells in which first data is stored among memory cell of a corresponding column;
   performing a read operation on all of the plurality of memory cells, upon a determination that an error detection code (EDC) check on any one row among the rows fails;
   calculating a number of memory cells in which the first data is stored with respect to each of the columns, based on a result obtained by performing the read operation;
   determining a column in which a bit flip occurs by comparing the calculated number and the count value of the first counter with respect to each of the columns; and
   determining that a memory cell of a row in which the EDC check fails among memory cells of the column in which the bit flip occurs is the bit-flipped memory cell.

10. The method of claim 9, wherein, in the checking of the column in which the bit flip occurs, it is determined that the bit flip occurs in a column where the calculated number and the count value of the first counter are not the same.

11. The method of claim 9, wherein, in the updating of the count value, a count value corresponding to a column where the data stored in the target row represents the first data and the data to be stored in the target row represents second data is decreased.

12. The method of claim 9, wherein, in the updating of the count value, a count value corresponding to a column where the data stored in the target row represents second data and the data to be stored in the target row represents the first data is increased.

13. The method of claim 9, wherein, in the maintaining of the count value, a count value corresponding to a column where both the data stored in the target row and the data to be stored in the target row represent the first data or represent second data is maintained.

14. The method of claim 9, further comprising flipping data stored in a memory cell determined as the bit-flipped memory cell.

15. The method of claim 9, wherein the EDC check on the one row is performed when a read operation on the one row is requested.

16. A memory device comprising:
an array of memory cells arranged in column and row directions;
a control circuit configured to control the array to perform read and write operations on a row basis;
a counting circuit configured to update a first number of memory cells storing first data on a column basis within the array at each write operation; and
a calculating circuit configured to count a second number of memory cells storing the first data on the column basis within the array,
wherein the data includes an error detection code (EDC) check bit,
wherein the calculating circuit detects, when read data has an error based on the EDC check bit, a column of which a memory cell has had a bit-flip by comparing the first and second numbers,
wherein the control circuit is configured to control the array to correct the bit-flip within the read data.

* * * * *